(12) United States Patent
Horton et al.

(10) Patent No.: US 8,387,993 B2
(45) Date of Patent: Mar. 5, 2013

(54) SEALING DEVICE AND METHOD OF PRODUCING THE SAME

(75) Inventors: Steuart Horton, Cleveland (GB); Lars Hultman, Linkoeping (SE)

(73) Assignee: Aktiebolaget SKF, Gothenburg (SE)

( * ) Notice: Subject to any disclaimer, the term of this patent is extended or adjusted under 35 U.S.C. 154(b) by 854 days.

(21) Appl. No.: 11/989,858

(22) PCT Filed: Jul. 29, 2006

(86) PCT No.: PCT/EP2006/007548
§ 371 (c)(1),
(2), (4) Date: Sep. 2, 2009

(87) PCT Pub. No.: WO2007/014731
PCT Pub. Date: Feb. 8, 2007

(65) Prior Publication Data
US 2010/0025939 A1  Feb. 4, 2010

(30) Foreign Application Priority Data

Aug. 1, 2005 (EP) .................................. 05016650

(51) Int. Cl.
*F16J 15/32* (2006.01)
(52) U.S. Cl. ........................ 277/551; 277/569
(58) Field of Classification Search .................. 277/551, 277/569, 571
See application file for complete search history.

(56) References Cited

U.S. PATENT DOCUMENTS

| 3,546,626 | A | * | 12/1970 | McGhee | 331/113 A |
| 4,859,493 | A | * | 8/1989 | Lemelson | 427/562 |
| 5,045,635 | A | * | 9/1991 | Kaplo et al. | 174/354 |
| 6,340,245 | B1 | | 1/2002 | Horton et al. | |
| 6,517,249 | B1 | | 2/2003 | Doll | |
| 2002/0167133 | A1 | * | 11/2002 | Bivens | 277/436 |
| 2004/0026428 | A1 | * | 2/2004 | Dupras et al. | 220/565 |
| 2004/0124587 | A1 | * | 7/2004 | Yamamoto | 277/549 |

FOREIGN PATENT DOCUMENTS

| DE | 196 04 334 C1 | 10/1996 |
| EP | 1 002 964 A1 | 5/2000 |
| SE | 9 702 676 L | 1/1999 |
| WO | WO 99/14512 A1 | 3/1999 |

* cited by examiner

*Primary Examiner* — Vishal Patel
(74) *Attorney, Agent, or Firm* — Buchanan Ingersoll & Rooney PC

(57) ABSTRACT

A sealing device for sealing a first side against a second side of a machine part, wherein the sealing device has a sealing element which contacts a counter element. At least a part of the sealing element and/or at least a part of the counter element is coated with a layer consisting of or containing fullerene-like carbon nitride (FL-CNx), wherein an interlayer of chromium (Cr) or aluminum (Al) or molybdenum (Mo) or titanium (Ti) or tungsten (W) or a diamond-like coating (DLC) or a metal-mix diamond-like coating (Me-DLC) is arranged between the surface of the sealing element and the layer consisting of or containing fullerene-like carbon nitride and/or between the surface of the counter element and the layer consisting of or containing fullerene-like carbon nitride.

18 Claims, 3 Drawing Sheets

| | Diamond | Si$_3$N$_4$ | TiN thin film | AISI 52100 | DLC thin film | CN$_{0.18}$ thin film | CN$_{0.14}$ thin film |
|---|---|---|---|---|---|---|---|
| H (GPa) | 80 | 16 | 25 | 6-9 | 10-20 | 18 | 7 |
| E (GPa) | 1050 | 310 | 350 | 200 | 100-200 | 120 | 37 |
| H/E | 0.076 | 0.052 | 0.071 | 0.038 | ≈ 0.1 | 0.15 | 0.19 |
| | "common" hard materials | | | plastic | elastic | super elastic | |
| Dry friction vs steel | 0.2 | 0.6 | 0.6 | 0.6-0.8 | 0.25 | 0.2 - 0.35 | |

Fig. 3

SEALING DEVICE AND METHOD OF PRODUCING THE SAME

TECHNICAL FIELD

The invention relates to a sealing device for sealing a first side against a second side of a machine part, wherein the sealing device has a sealing element which contacts a counter element. Furthermore, the invention relates to a method of producing such a sealing device. The invention is suitably applied to a plurality of different sealing devices, especially in the field of bearing technology.

BACKGROUND

For many applications sealing devices are required which seal a first side of a machine part against a second side of it. E. g. an oil side (first side) has to be sealed against an air side (second side) at a shaft of a combustion engine. Also, in many cases a bearing arrangement has to be sealed which is done by sealing devices of the kind mentioned above. Such sealing devices and their sealing elements are under high load as often they have to be pressed against their counter element by biasing means, e.g. springs, to ensure tightness of the sealing arrangement. Therefore, attempts have been made to strengthen the durability of the sealing elements. This applies especially if lubrication conditions are poor.

For metal parts different methods for applying coatings are known. Most of them are not applicable for sealing elements which consists normally of rubber material, elastomer material and especially polytetraflourethylene (PTFE).

For example U.S. Pat. No. 6,340,245 B1 describes a roller bearing having an inner ring, an outer ring and rolling elements which are in rolling contact with the raceways of the rings. The rolling elements as well as the raceways of the rings are coated with a metal-mixed diamond-like carbon layer. Especially, the respective elements are coated with a metal-mixed diamond-like carbon coating comprising alternating layers of predominantly diamond-like carbon, but containing some metal carbide, and layers of predominantly metal carbide, but containing some of the diamond-like carbon.

SUMMARY OF THE INVENTION

While the resistance against high stresses is improved by the described coating of the parts it is disadvantageous that the elasticity of the pre-known coatings is quite low. This can lead to cracks during the use of the sealing device so that the adhesion of the coating is jeopardized. As a result, the effective lifetime of the sealing device is reduced if damages of the coating take place. Of course, this is especially disadvantageously if sealing elements of bearings are concerned.

Therefore, it is an object of the invention to propose an improved sealing device, which has better properties especially with respect to the durability of the sealing element.

The solution of this object according the invention is characterized in that at least a part of the sealing element and/or at least a part of the counter element is coated with a layer consisting of or containing fullerene-like carbon nitride (FL-CNx), wherein an inter-layer of chromium or aluminium or molybdenum or titanium or tungsten or a diamond-like coating or a metal-mix diamond-like coating is arranged between the surface of the sealing element and the layer consisting of or containing fullerene-like carbon nitride and/or between the surface of the counter element and the layer consisting of or containing fullerene-like carbon nitride. Thus, at least a part of the surface of the sealing element and/or the counter element is coated with a layer consisting of or containing a functional part of fullerene-like carbon nitride.

Preferably, the contact area between the sealing element and the counter element is coated with the layer.

The sealing element can consist of rubber material, of elastomer material or of polytetraflourethylene (PTFE). It can be pressed against the counter element by means of a spring.

The bonding of the layer to the sealing element and/or the counter element is significantly improved with use of the inter-layer of chromium, of aluminium, of molybdenum, of titanium or of tungsten which is arranged between the surfaces of the sealing element and the layer consisting of or containing fullerene-like carbon nitride and/or between the surfaces of the counter element and the layer consisting of or containing fullerene-like carbon nitride.

Also it is possible and beneficial that an inter-layer of a diamond-like coating (DLC) or of a metal-mix diamond-like coating (Me-DLC) is arranged between the surfaces of the sealing element and/or the counter element and the layer consisting of fullerene-like carbon nitride. The application of such diamond-like coatings or metal-mix diamond-like coatings is quite easy (see e.g. the above mentioned U.S. Pat. No. 6,340,245 B1) and a coating of fullerene-like carbon (FL-CNx) can be added. Additional benefits can be obtained where a top surface functionalization is desired, e.g. for designed surface energy to suit a given lubricant/oil.

The thickness of the layer consisting of fullerene-like carbon nitride is preferably between 0.1 µm and 10 µm, especially between 0.1 µm and 1 µm. The thickness of the inter-layer is preferably between 1 nm and 5 µm, preferably between 25 nm and 5 µm. Plasma processed or arc-etched surfaces (no actual deposition, but implantation) with components like Cr and Ti as well as diffusion bonded components work as well.

The layer consisting of fullerene-like carbon nitride is deposited on the sealing element and/or the counter element preferably by means of magnetron sputtering. Also it is possible that the layer consisting of fullerene-like carbon nitride is deposited on the sealing element and/or on the counter element by means of physical vapour deposition (PVD), by means of chemical vapour deposition (CVD) or by means of a hybrids thereof, any of which or combined process can include some plasma for limited ion assistance to the coating during or after deposition. I. e. fullerene-like carbon nitride coatings implemented in a graded or multilayered coating with any type of diamond-like carbon is also beneficial and would give improvement compared with DLC alone.

In one embodiments of the invention, deposition process temperatures for the sealing element and/or the counter element are kept below 180° C., preferably at or below 150° C.

With regard to the fullerene-like carbon nitride according to the invention the following remarks are made:

Carbon nitride thin film materials has been described in "Fullerene-like Carbon Nitride; A Resilient Coating Material" from Lars Hultman, Jörg Neidhardt, Niklas Hellgren, Hans Sjöström, and Jan-Eric Sundgren in Materials Research Society Bulletin, 28 (March), 2003, 194. In this reference the nature of fullerene-like carbon nitride (FL-CNx) is presented. This patent application involves an original application and the invented solution to process fullerene-like carbon nitride coatings for sealing elements in different applications including adhesion technology and the optimum layer thickness of each required layer. Also, the process temperature allowing for different sealing materials is given.

Preferably, unlike the pure carbon fullerene molecules which do not form strong materials, the present invention uses fullerene-carbon nitride coatings for sealing devices which represent an original functionalization of the fullerenes as dense, solid, well-adhering coatings that can be fabricated for benefits stated in this application. The functionalization is obtained by the doping or alloying by nitrogen to the carbon during a coating deposition processes described herein.

The carbon structure family was completed by a new modification of pure carbon. In 1990 the discovery of the fullerenes was done and the possibility for the production of fullerenes in large amounts was achieved (see W. Krätschmer, L. D. Lamb, D. R. Huffman, Nature 347 (1990) 354). Fullerenes are polyeders build up by n three time coordinated carbon atoms with 12 pentagons and n hexagons, were the minimum for n is equal 20. Fullerenes fulfill the EULER's theorem, where a polyeder build up from pentagons and hexagons has to contain exactly 12 pentagons, to build a closed structure. Following this rule, the dodekaeder with 20 carbonatoms is the smallest possible fullerene. Actual the smallest fullerene is the $C_{60}$, because important for the stability of the structure is, that no pentagons are side by side. This is described by the Isolated Pentagon Rule (IPR). If two pentagons are joined, the tension of the binding is increasing and the structure is not anymore energetically stable.

The carbon atoms in fullerenes each have three neighbours and all bonds more or less saturated. Thus, in chemical reactions fullerenes are not reacting aromatic ("superbenzene"), they show aliphatic behavior with weak bonding of fullerene molecules. Good solvents for fullerenes are $CS_2$, o-dichlorobenzene, toluene and xylene. Fullerenes are insoluble in water and stable in air. Thin layers of fullerenes are coloured from yellow to yellow-green. For the effects of doping with nitrogen, the only nitrogen-containing fullerenes formed in nature by wet-chemical methods is the $C_{59}N_1$ so called azafullerene. It readily dimerizes to form $\{C_{59}N_1\}_2$ molecules and thus becomes inert. The present invention here is to preferably use a vapour deposition method which can be used to grow solid coatings of carbon nitride that consists of nitrogen-containing (aza-)fullerene fragments. In the cross-linked form they give the strength needed for a bearing application. The presented process is a practical and technologically viable process to functionalize otherwise relatively inert fullerenes by depositing the material with a synthetic growth.

The fullerene-like (FL) structure derived for sealing devices arises from the presence of bent and cross-linked graphitic basal planes (also known as graphene). This specific functionalization of the fullerenes is obtained by the precise insertion of nitrogen atoms substituting for carbon in the graphene planes such that the carbon coordination is retained, but that the extra electron provided by each nitrogen atom promotes the formation of pentagon rings that is geometrically required to obtain the plane bending (its fullerene-likeness), but also offer cross-linking sites. This structure results in a compliant and tough material at the same time (high elastic recovery, >80%) that is here presented for use as an original coating material to sealing devices.

It is a central part of the present invention that the fullerene-like carbon nitride material structure for coatings is a much different material to pure carbon fullerenes and fullerides (crystallized forms of fullerene molecules with or without doping of metals). The latter material is relatively soft and has much less elasticity and no resiliency compared to the FL-CNx compounds.

Fullerene-like carbon nitride is also qualitatively different to diamond-like carbon as the latter have (predominantly) four-fold coordinated carbon atoms and the former exclusively three-fold coordination. In a useful quality, the fullerene-like carbon nitride coating has a similar low-friction performance as non-hydrogenated DLC.

In a further definition of the fullerene-like CNx according to this invention, it is qualitatively being non-crystalline and different from any crystalline form of carbon nitride, such as in pre-known beta-C3N4, alfa-C3N4 or other compound or phase. It is significant that the fullerene-like CNx according to the invention is not crystalline thus it does not (by definition) form part of any superlattice based carbon- and nitrogen-containing material.

Preferably, the production of fullerene-like CNx is done by magnetron sputtering, but practically all physical vapour (PVD) and chemical vapour deposition (CVD) processes including some plasma for limited ion production and hybrids thereof can be used to produce the coating. Important parameters for the growth of the substance are the substrate temperature (below 180° C. up to 500° C.) is also crucial with temperature sensitive precision bearing components, where high temperatures will result in none uniform dimensional changes and loss of precision and can reduce the load carrying capacity of the substrate due to softening. Unbalanced reactive magnetron sputtering of a graphite target in a nitrogen-containing atmosphere is a preferred technique is essential for the growth of fullerene-like $CN_x$ structures due to $C_xN_y$ molecules (especially CN and/or $C_2N_2$ or complexes thereof molecules), which are formed in the process or can be added to the process as they act as precursors or growth templates for the intended structure for best coating performance. This understanding makes it possible to intentionally add such molecules by a gas source for possible promotion of the fullerene-like structure.

The deposition process is best described as a hybrid of plasma vapour deposition and chemical vapour deposition. In the discussed fullerence-like structure, deformation energy is predominantly stored elastically and released after load removal giving it a tough and resilient character. In addition, the relatively low modulus leads to a spreading of the contact stresses over a larger volume and consequently to low stress gradients at the substrate/film interface. This hinders substrate/film delamination under load and therefore results in a high load bearing capability, while the coating asperities behave elastically with no tendency to brittle fracture in tribological contact.

The sealing device according to the invention shows different advantages:

Due to the low deposition temperature the coating can be applied to any sealing element without being detrimental to the fatigue property of the contact and without material micro-structural changes which would lead to unfavorable dimensional variation of the element.

The adhesion of the coating to the substrate (sealing element or counter element) can be at a level sufficient for carrying friction contact fatigue stresses in the GPa range (3-4 GPa) with the appropriate choice of inter-layer and inter-layer structure.

Cohesion within the coating is also high and is enhanced by the cross linking and curvature of the fullerene-like nano-to-micro-layers and convoluted microstructure.

The super-elastic characteristic of the coating allows it to absorb locally large deformations from handling damage or particle denting, in a purely elastic way. The initiation of micro-cracks—due to plastic weakening—is avoided. High stress concentrations associated to micro-crack tips are also avoided. In this way crack initiation and propagation (characterizing rolling contact fatigue and surface initiated failure) is either avoided or at lease drastically reduced.

Under marginal or no lubrication the fullerene-like coating provides a low coefficient of friction compared to that one of rubber-steel contact and at least as good as for non-hydrogenated DLC-steel. In this way, adhesive wear damage and scuffing initiation/propagation is avoided or at least drastically reduced.

Further, the coating has very good wetting behaviour which enhances transport and retention of lubricant fluid into the (rolling or sliding) contact. Therefore the coating will improve the lubrication condition of the contact in case of lubricant starvation or marginal lubrication conditions. The coating can be used for this purpose when applied as an additional processing step to any contemporary DLC-coated bearing technology as mentioned above.

By virtue of the concurrent coating surface etching of the presented deposition process, less strongly bonded growth species at surface protrusions are preferentially removed. Thus, the coating can also be applied to obtain a levelling of the substrate surface micro-geometry/micro-topography. This is leads to very smooth contacts (suitable for thin film lubrication) and reduce run-in effects for the bearing.

The coating will also ensure a long service life for sealing devices working with high contamination level in the lubricant. In such cases the coating will reduce the abrasive wear damage due to the combined action of hardness low-friction coefficient, high fracture toughness and super-elasticity. This is also the case with none abrasive particles such as 'soft' metallic contaminants where indentation are formed with raised edges, where subsequent over rolling will give enhanced stress levels at theses raised edges and can result in early surface initiated failures. The presence of such a coating, which also acts in a super elastic manner, will alleviate such effects leading to delayed failure or prevention of failure under contaminated conditions I. e. the mechanical properties of the sealing device are improved, especially the sealing element has a longer life time and better abilities to keep its shape with respect to possible wear to make sure tightness of the device. Contamination of the sealing device does not have a big influence.

Fullerene-like carbon nitride (FL-CNx) compound as a resilient coating has elastic recovery values of ≧70% as determined by nanoindentation measurements. Said FL-CNx coating consists predominantly of carbon in the form of bent and cross-linked graphene planes in which N atoms substitute for C to induce the formation of odd-membered rings, preferably pentagons, so as to induce the fullerene-likeness. The corresponding structure can be determined by electron microscopy methods. N is a structurally integrated in the FL-CNx coatings and as such it yields the cross-linking of fullerene-like structural units. The corresponding bonding can be determined by spectroscopic methods. The range of nitrogen contents in the FL-CNx coatings covered by the invention is preferably between 1 and 35 at.-%. Doping or alloying by elements other than N, in particular P, S, and B, by itself or in combination with N that gives FL-CNx coatings are also beneficial with regard to the solution of the above mentioned object.

In some pre-known application the use of hexagonal boron carbon nitride is proposed. Hexagonal boron carbon nitride is different from fullerene-like carbon nitride according to the present invention in two ways:

A first aspect is that there is B (boron) in one and not in the other.

A second important aspect is that the hexagonal phase has an ordered lattice bonding different from FL-CNx. In fact FL-CNx has C bonded in pentagons which is not the case for the other. Both chemistry and bonding structure determine a material. Thus, they are different.

Further preferred embodiments of the invention are defined below and in the claims.

BRIEF DESCRIPTION OF THE DRAWINGS

The drawing shows an embodiment of the sealing device according to the invention.

FIG. 3 shows characteristic properties of two fullerene-like CNx coatings in comparison to some known technologically important materials.

DETAILED DESCRIPTION OF THE INVENTION

Figure 1:
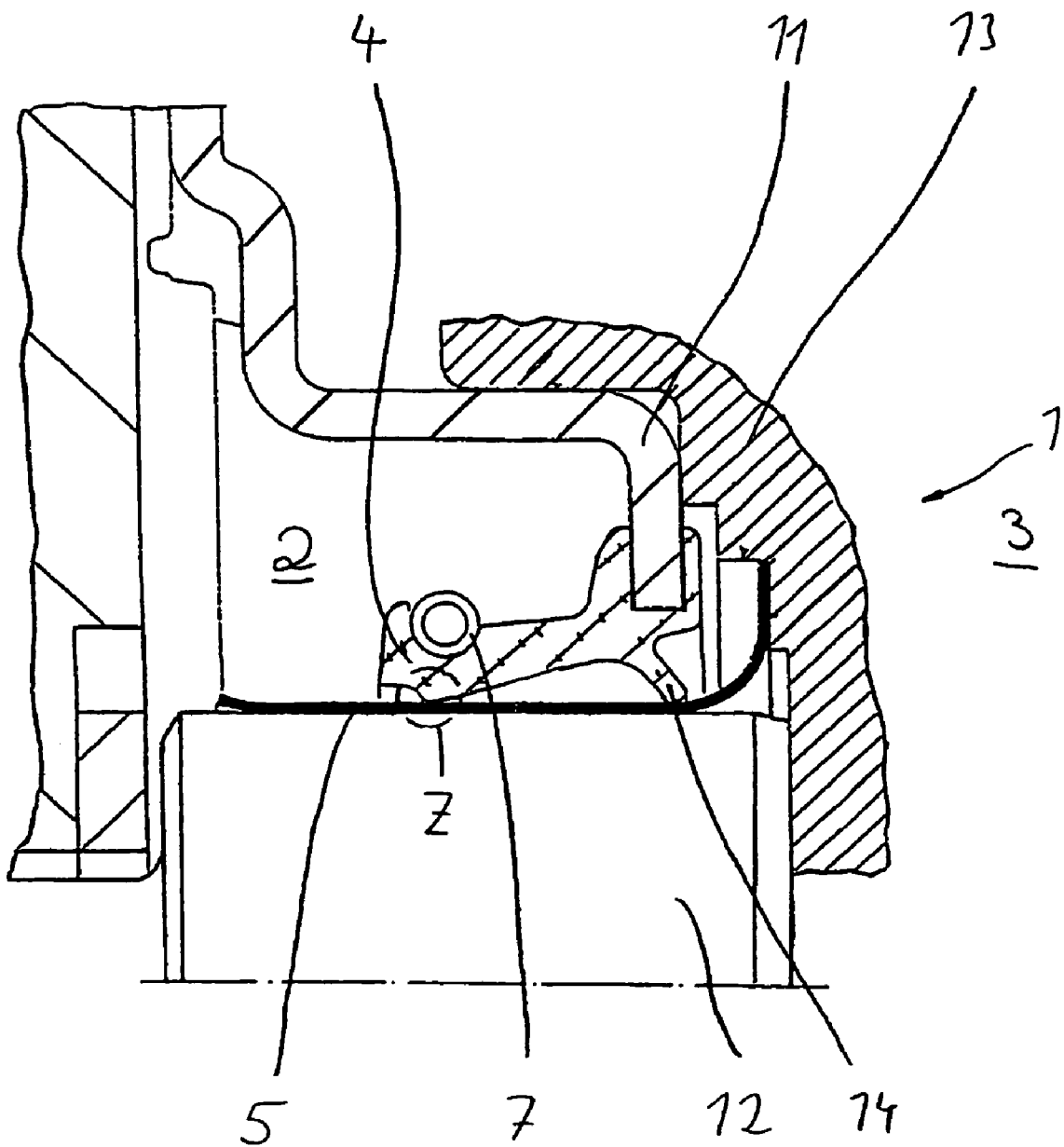
FIG. 1 shows a sectional view of a sealing device.

FIG. 1 shows an example for a sealing device 1. It has a sealing element 4, which is carried by a carrier element 11. The sealing element 4 consists of elastomer material. It is pressed against a counter element 5 by means of a spring 7. The counter element 5 is a sleeve which is mounted on a shaft 12. The carrier element 11 is fixed in a housing part 13.

So, an oil side 2 (first side) is sealed against an air side 3 (second side).

As can be seen in FIG. 1 a further sealing element 14 can be arranged for which the same applies as for the sealing element 4 as explained later on.

Figure 2:
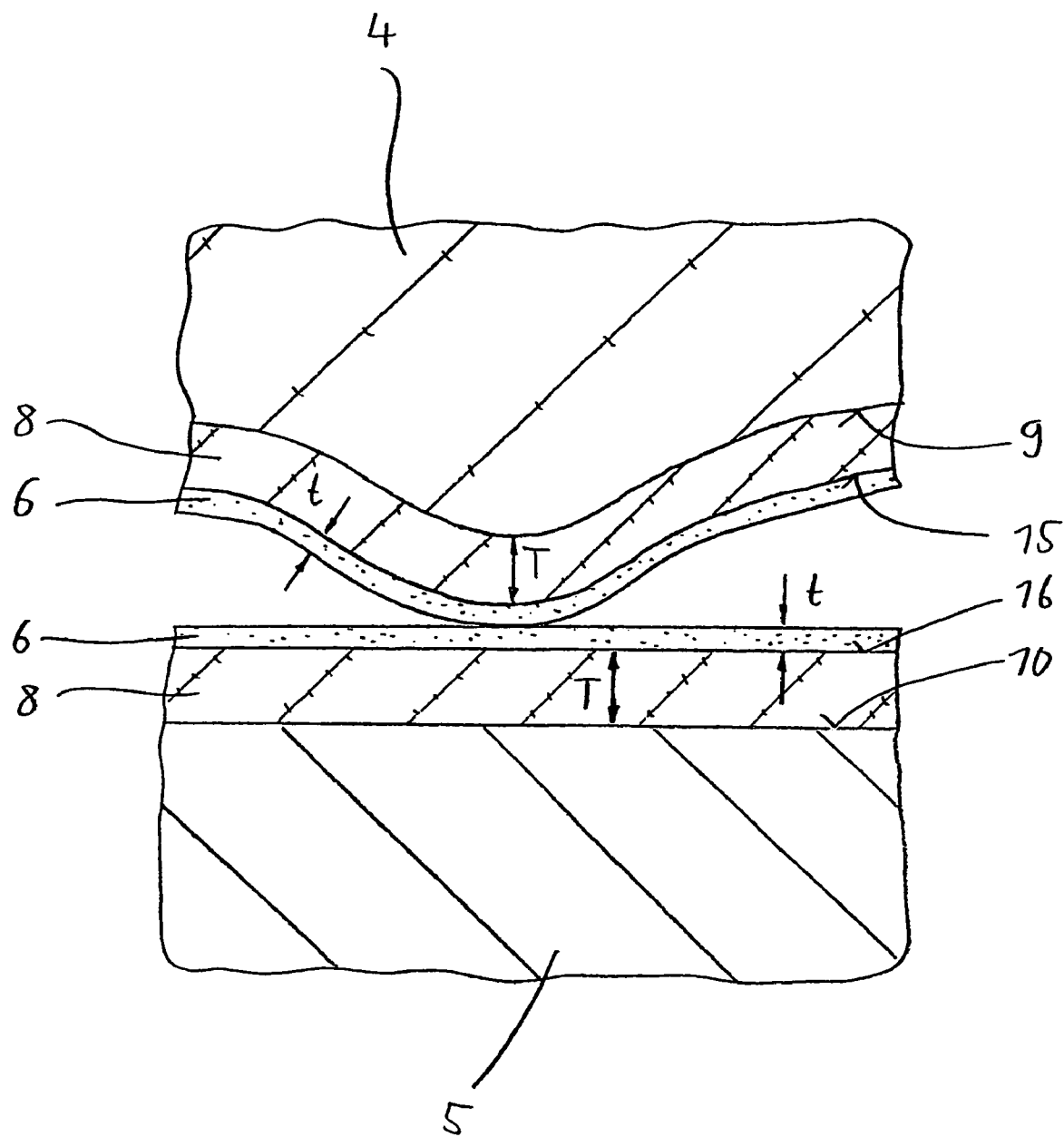
FIG. 2 shows the detail "Z" in FIG. 1 in a magnified view.

As can be seen in the magnified illustration according to FIG. 2, the surface 9 of the sealing element 4 and the surface 10 of the counter element 5 are coated with two layers 8 and 6 each. Layer 8 is a metallic layer consisting of chromium, of aluminium, of molybdenum, of titanium or of tungsten. The thickness T of this layer 8 is preferably between 25 nm and 5 µm.

On the surface 15 of the layer 8 of the sealing element 4 and on the surface 16 of the layer 8 of the counter element 5 another layer 6 is arranged. This layer 6 consists of fullerene-like carbon nitride as discussed above. The thickness t of the layer 6 is smaller than the thickness T of the layer 8 and is preferably between 0.1 µm and 10 µm. Even a layer thickness below 0.1 µm can be sufficient.

Incorporation of nitrogen in the carbon, which has a hexagonal atomic pattern, helps to develop sturdy bonds with the carbon atoms, transforming the hexagonal graphitic structure into a mixed pentagonal-hexagonal network. This leads to curvature of the network forming amorphous interlocked multi-layers and fullerene-like shell structures. The formation of additional tight but flexible bonds (acting as strong hinges) between the fullerene like layers helps to strengthen the microstructure providing a coating with excellent and novel tribological properties. It is significant that the otherwise relatively inert carbon fullerene molecules are functionalized by the inclusion of nitrogen atoms into the structure by the deposition of dense and solid coatings of fullerene-like carbon nitride.

As mentioned above the coating has a low friction coefficient, with high thermal conductivity, with high hardness and super-elasticity, with high temperature and chemical stability and with good substrate adhesion and strength, especially when applied with an inter-layer.

Carbon nitride films ($CN_x$) basically show similar beneficial tribological behavior as diamond like carbon coatings as described in mentioned U.S. Pat. No. 6,340,245 B1. As diamond like carbon, the coating according to the present invention can be deposited at relatively low temperatures between 150° C. and approximately 350° C., typically <240° C. This relatively low deposition temperature will avoid destruction of the sealing element 4 and/or the counter element 5.

The proposed $CN_x$ films exhibit extreme elasticity, which prevents plastic (non-recoverable) deformation and micro-cracking of the coating. This property combined with the low modulus of elasticity has the capability of dissipating contact loads over large areas/volumes facilitating the formation of lubricant film. The coatings can therefore be described as hard (5-30+GPa, typically 8+/−2 GPa) and "rubbery" or "fracture tough" due to its extreme elasticity. The characteristic properties of two fullerene-like CNx coatings is presented in FIG. 3 in comparison to some known technologically important materials.

With regard to FIG. 3 the following explanations are made:

In this figure the nanoindentiation results are depicted showing the mechanical properties as well as the dry sliding friction coefficient versus steel. When a material which experiences both elastic and plastic deformation is strained by indentation, the behaviour during the loading-unloading cycle is determined by the degree of imposed strain relative to the yield strain. With E being the Young's modulus (in GPa) and H being the (Meyer) hardness (in GPa) the H/E ratio is a descriptive parameter for the elastic-plastic behaviour.

As can be seen from FIG. 3 the present invention has preferably a CNx coating having a H/E ratio above 0.1, preferably above 0.12, especially between 0.12 and 0.2 showing a "super elastic" property.

Basically the coating allows large elastic (recoverable) deformation without the initiation of a crack usually associated with the contact fatigue damage process. The super-elastic property of $CN_x$ films makes this material ideal for protective coatings of sealing surfaces. Sealing elements provided with this type of protective coating will drastically reduce the chance of surface initiated failure and will have an extended service life in all conditions. In particular, dramatic performance improvements are expected in case of reduced lubrication (thin film, mixed or dry conditions) and presence of contamination debris in the lubricant.

In the case of localized stress concentration developed at certain locations of the sealing elements the local film thickness is reduced (due to the contact micro-slip) leading to an increase of the surface traction. This causes a further increase of the local temperature and additional reduction (or collapse) of the lubricant film. The use of the CNx film according to the invention will drastically improve the survival capability of the sealing surface affected by dent (or other) damage or in case of reduced film thickness. This is achieved by the combined action of the super-elasticity and low friction coefficient of this film. The super-elasticity will allow the coating to adapt to the dent damage without cracking or faking and the low coefficient of friction will reduce the local traction and adhesive shear stress which is the primary cause of micro pitting.

During the introduction of contamination particles in the zone between the sealing element and the counter element the low coefficient of friction of CNx will be beneficial to the life of the sealing device. Indeed, the low coefficient of friction of CNx combined with high elasticity will reduce the stress build up during indentation by foreign particles, leading to shallower and less damaging indentations.

When applying the fullerene-like coating, basically a batch vacuum (single or multi chamber) process is used which is plasma assisted and provides a vapor of ions, atoms, and molecules of carbon and nitrogen that are deposited onto the substrate (rings or interlayer). Low deposition temperatures are obtained if low energy input to the substrate is used. The sealing components to be covered with the layers are pre-cleaned outside the coating vessel. A plasma cleaning process can follow inside the coating vessel. Afterward, the interlayer 8 as well as the layer 6 of fullerene-like carbon nitride is applied in the vessel.

Depending on the characterization technique and processing, the coatings may also be described as amorphous (such as by XRD analysis) or locally crystalline (such as by high-resolution electron microscopy) in a fullerene-like carbon nitride matrix. In each case, good tribological behaviour has been achieved in for example sliding contacts. The deposition temperatures are such that the coatings are not applicable to temperature sensitive materials such as standard sealing material. These materials ideally require that the substrate does not reach temperatures of above 160° C. Temperatures above this which will result in a destruction.

The amorphous CNx coatings are also limited in terms of adhesion and cohesion and are therefore prone to early coating failure, when contact stresses are high (in the GPa range) and when these are combined with slip or sliding.

A low energy processing window has been established which allows the application of CNx to sealing material such that the CNx can be applied at temperatures of 150° C. The conditions are such that the coatings also have a fullerene-like structure which significantly enhances their load carrying capacity such that application to sealing devices with contact stresses in the GPa range can be achieved.

The fullerene structural units are also cross linked which dramatically increases their resistance to near surface shear stress, which would normally lead to in plane (cohesive failure of the coating). This feature incidentally is a limit on pre-known Diamond-Like-Coatings (DLCs) and metal-mix DLCs (Me-DLCs).

With respect to the conditions for deposition of fullerene-like CNx it is noted that the ion flux and the beam energy conditions have been identified for low temperature deposition of fullerene-like CNx with cross linking.

As explained above, other features of the (magnetron sputtering) deposition process are that metallic inter layers can be added to improve intrinsic adhesion at or near the interface with the substrate and the layers can be graded into the fullerene-like CNx coating, which does not require pre-cursor inter layers in order to seed the CNx structure in the upper part of the coating.

REFERENCE NUMERALS

1 Sealing device
2 First side (oil side)
3 Second side (air side)
4 Sealing element
5 Counter element
6 Layer consisting of or containing fullerene-like carbon nitride
7 Spring
8 Inter-layer
9 Surface of the sealing element
10 Surface of the counter element
11 Carrier element
12 Shaft
13 Housing part
14 Sealing element
15 Surface
16 Surface
t Thickness of the layer consisting of or containing fullerene-like carbon nitride
T Thickness of the inter-layer

The invention claimed is:

1. Sealing device for sealing a first side against a second side of a machine part, wherein the sealing device has a sealing element which contacts a counter element, wherein at least a part of the sealing element and at least a part of the counter element are coated with a layer consisting of or containing fullerene-like carbon nitride (FL-CNx) and wherein an inter-layer is arranged between a surface of the sealing element and the layer consisting of or containing fullerene-like carbon nitride and between a surface of the counter element and the layer consisting of or containing fullerene-like carbon nitride, wherein the inter-layer consists of chromium (Cr) or aluminum (AI) or molybdenum (Mo) or tungsten (W) or a diamond-like coating (DLC) or a metal-mix diamond-like coating (Me-DLC).

2. Sealing device according to claim 1, wherein a contact area between the sealing element and the counter element is coated with the layer consisting of or containing fullerene-like carbon nitride.

3. Sealing device according to claim 1, wherein the sealing element is comprised of rubber material or of elastomer material or of polytetraflourethylene (PTFE).

4. Sealing device according to claim 1, wherein the sealing element is pressed against the counter element by a spring.

5. Sealing device according to claim 1, wherein the layer consisting of or containing fullerene-like carbon nitride possesses a thickness between 0.1 μm and 10 μm.

6. Sealing device according to claim 5, wherein the thickness of the layer consisting of or containing fullerene-like carbon nitride is between 0.1 μm and 1 μm.

7. Sealing device according to claim 1, wherein the inter-layer possesses a thickness between 1 nm and 5 μm.

8. Sealing device according to claim 7, wherein the thickness of the inter-layer is between 25 nm and 5 μm.

9. Sealing device according to claim 1, wherein the layer consisting of or containing fullerene-like carbon nitride is deposited on the sealing element and on the counter element by magnetron sputtering.

10. Sealing device according to claim 1, wherein the layer consisting of or containing fullerene-like carbon nitride is deposited on the sealing element and on the counter element by physical vapour deposition (PVD).

11. Sealing device according to claim 1, wherein the layer consisting of or containing fullerene-like carbon nitride is deposited on the sealing element and on the counter element by chemical vapour deposition (CVD).

12. Sealing element according to claim 10, wherein the layer consisting of or containing fullerene-like carbon nitride is deposited on the sealing element and on the counter element by a hybrid of physical vapour deposition (PVD) and chemical vapour deposition (CVD).

13. Sealing device according to claim 1, wherein the temperature of the sealing element and the counter element during deposition of the layer consisting of or containing fullerene-like carbon nitride is kept below 180° C.

14. Sealing device according to claim 1, wherein elements other than nitrogen (N) are doped, or alloyed, or both, in the fullerene-like carbon nitride.

15. Sealing element according to claim 14, wherein the elements other than nitrogen (N) that are doped, or alloyed, or both, in the fullerene-like carbon nitride include one or more of phosphorus (P), sulfur (S), and boron (B).

16. Sealing element according to claim 1, wherein the fullerene-like carbon nitride (FL-CNx) has a ratio $H/E > 0.1$, wherein H is the Meyer hardness (in GPa) and E is the Young's modulus (in GPa).

17. Sealing element according to claim 16, wherein the ratio $H/E > 0.12$.

18. Sealing element according to claim 16, wherein the ratio H/E is between 0.12 and 0.2.

* * * * *